3,249,588
PROCESS FOR PREPARING FINELY DIVIDED POLYIMIDE PARTICLES OF HIGH SURFACE AREA
Walter George Gall, Shellbourne, Wilmington, Del., assignor to E. I. du Pont de Nemours and Company, Wilmington, Del., a corporation of Delaware
No Drawing. Filed June 6, 1962, Ser. No. 200,307
5 Claims. (Cl. 260—47)

This invention relates to novel polymeric materials and has as its object a novel method for the preparation of polyimide powders.

The polyimide powders of this invention are prepared by reacting at least one organic diamine having the structural formula:

$$H_2N-R^1-NH_2$$

wherein $R^1$ is a divalent, aromatic radical, with at least one tetracarboxylic acid dianhydride having the structural formula:

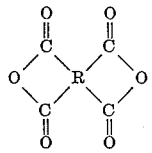

wherein R is a tetravalent radical containing at least one ring of six carbon atoms characterized by benzenoid unsaturation, the four carboxyl groups of said dianhydride being attached directly to different carbon atoms in a ring of the R radical, in an organic solvent for at least one of the reactants, the solvent being inert to the reactants, preferably under anhydrous conditions, at a temperature below 175° C. and preferably below 100° C. sufficient to form the polyamide acid. The thus formed polyamide acid is then converted to the polyimide while in solution by heating in the presence of a tertiary amine which acts as a Lewis base. The tertiary amine can form the solvent for the polymerization reaction, or can form part of the solvent for the polymerization reaction or can be added after polymerization.

Ordinarily, polyamide-acids can undergo two reactions. One is hydrolysis which breaks the chain and thus degrades the polymer. The other is conversion to the corresponding polyimide. These two are competing reactions, and unless something is done to prevent significant hydrolysis, a worthless product is obtained. It has now been found that tertiary amines catalyze the thermal conversion of polyamide-acids to polyimides, thus increasing the ring closure reaction rate to an extent relative to the hydrolysis reaction rate that only insignificant hydrolysis occurs. The conversion of a given polyamide-acid to the corresponding polyimide may thus be accomplished at a lower temperature, in a shorter time, and with less degradation (including hydrolysis) than is possible in the absence of the tertiary amine. This conversion may be carried out in a variety of ways including: (1) heating of a solution of the polyamide-acid in a non-reactive solvent with the tertiary amine, (2) heating of a suspension of the polyamide-acid in a non-reactive, non-solvent with the tertiary amine, and (3) heating of a solution of the polyamide-acid in a tertiary amine in which it is soluble.

In general, all tertiary amines are operable, including aliphatic, aromatic, heterocyclic wherein the tertiary amine is part of the hetero-ring, heterocyclic wherein the hetero ring is a substituent attached to the amino nitrogen atom and mixed types. However, on a mole basis, less amine is required when it is a relatively strong base.

Conversions in solution are preferred and are carried out at from 100° C. to 200° C. As little as 0.1 equivalent of strong amine per mole of polyamide acid has been effective, however, amounts as large as 6.2 equivalents of strong tertiary amine have been used. The preferred range is from 0.5 to 2.0 equivalents of strong tertiary amine per acid amide group.

Pyridine ($K_B=1.4\times10^{-9}$) is a preferred tertiary amine since it can be used as the solvent for both reactants in the polymerization reaction as well as functioning as the catalyst. $K_B$ is the basic ionization constant as listed in the table on page 1202 of the 10th Edition of Lange's "Handbook of Chemistry." Pyridine and other tertiary amines having about the same activity ($K_B=1\times10^{-8}$ to $10^{-10}$) are used in an amount such that there is more than one molecule of tertiary amine for each amide-acid group in the polyamide-acid. Suitable tertiary amines having about the same activity as pyridine include 3,4-lutidine, 3,5-lutidine, 4-methylpyridine, 3-methylpyridine, 4-isopropylpyridine, N,N-dimethylaniline, quinoline $$(K_B=6.3\times10^{-10})$$

isoquinoline, and 4-benzylpyridine. Trimethylamine $$(K_B=5.27\times10^{-5})$$

triethylamine ($K_B=5.65\times10^{-4}$), N,N-dimethylbenzylamine ($K_B=8.5\times10^{-6}$), N,N-dimethyldodecylamine and triethylenediamine are more reactive than pyridine and can be used in smaller amounts than pyridine. The following operable tertiary amines are less reactive than pyridine, probably because of steric hindrance, and are used in larger amounts. These include 2-ethyl pyridine, 2-methyl pyridine, 2,6-lutidine, and 2,4,6-collidine. These tertiary amines all have an ionization $K_B$ above $1\times10^{-10}$. The polyimides are very insoluble and precipitate out of the polyamide acid and solvent solution as formed. The conversion reaction from polyamide-acid to polyimide is preferably carried out at a temperature above 100° C. and below 200° C. Above 200° C. the polymer begins to degrade rather rapidly, while below 100° C. the conversion goes too slowly. The water formed by the closing of the polyimide ring can be removed during the reaction by distillation which may lead to more rapid conversion of polyimide and higher molecular weight polymer.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. It is preferred that neither reactant be present in over 7 mole percent excess of the other reactant. Instead of using an excess of one reactant to limit the molecular weight of the polyamide-acid, a chain terminating agent such as phthalic anhydride may be used to "cap" the ends of the polymer chains. The use of pure reactants and pure solvents will also foster the formation of polyamide-acids, and subsequently polyimides, of high molecular weight. The use of pure materials is also important to prevent incorporation of chemically and/or thermally unstable materials in the ultimate polymer.

In the preparation of the polyamide-acid intermediate, it is essential that the molecular weight be such that the inherent viscosity of the polymer is at least 0.1, and preferably from 0.3 to 5.0. The inherent viscosity is measured at 35° C. at a concentration of 0.5% by weight of the polymer in a suitable solvent. For the preferred range given above N,N-dimethylacetamide is the solvent. To calculate inherent viscosity, the viscosity of the polymer solution is measured relative to that of the solvent alone by measuring the times of flow of equal volumes through the capillary of a standard viscometer and using the following equation:

$$\text{Inherent viscosity} = \frac{\text{natural logarithm}\frac{\text{Viscosity or time of solution}}{\text{Viscosity or time of solvent}}}{C}$$

where C is the concentration expressed in grams of polymer per 100 milliliters of solution. As known in the polymer art, inherent viscosity is directly related to the molecular weight of the polymer.

The presence of polyimides is evidenced by their insolubility in cold basic reagents as opposed to the rapid solubility of the polyamide-acid. Their presence is also apparent if the polyamide-acids are scanned with infrared during conversion to the polyimide. The spectra initially show a predominating absorption band at ca. 3.1 microns due to the NH bond. This band gradually disappears and as the reaction progresses, the polyimide absorption band appears, a doublet at ca. 5.64 and 5.89 microns and a peak at 13.85 microns. When conversion is completed, the characteristic polyimide bands predominate.

It is obvious that agitation due to boiling of a liquid or to mechanical agitation will aid in precipitating the solid polyimide in the form of a finely divided powder. Mechanical agitation will also aid in preventing skin formation on the sides of the containing vessel and will improve heat transfer from the walls to the liquid. The particles of polyimides, produced by the process of this invention, are characterized by surface areas of at least 0.1 square meter/gram, usually above 1 and preferably from 2 to 500 square meters/gram.[1]

Because of the wide variation in rheological properties of the polyimide powders, prepared by the process of the present invention, some can be molded or sintered by conventional techniques while others can be fabricated only by coalescing, giving articles that display outstanding physical and chemical properties which make them very useful.

The ability of coalesce these high surface area powders provides a unique method of obtaining thick objects free of solvents. The coalescence seems to be neither a molding operation such as is practiced with phenolics, polyamides, vinyl polymers, etc., nor a sintering operation such as is practiced with polytetrafluoroethylene since the conditions necessary for coalescence are so different. That is, coalescence results from a combination of heat and pressure, but occurs at a temperature below the crystalline melting point of the polyimide. In most cases, the crystalline melting points of these polyimides are above 500° C. Most of these polyimides degrade in the region of their crystalline melting points and, hence, cannot be fabricated in the molten state. Furthermore, the coalescence is a surface phenomenon since microscopic examination of the coalesced solid indicates that the structure and shape of the original particles have been disturbed but little.

The inherent viscosity of the polyimide is measured at 35° C. as a 0.5% by weight solution in a suitable solvent. The solvent can be selected from the group consisting of concentrated (96%) sulfuric acid, fuming nitric acid, the monohydrate of dichlorotetrafluoroacetone and the monohydrate of monochloropentafluoroacetone. If the polyimide is not soluble in any of these solvents to the extent of 0.5% and if particles of the polyimide can be formed into a strong coalesced disc (strength index greater than 0.3) by the process described hereinafter, then its inherent viscosity may be considered to be greater than 0.1. To confirm this, one may obtain the intrinsic viscosity. This viscosity is determined by measuring viscosity at several lower concentrations, plotting the values, and extrapolating to infinite dilution. The intrinsic viscosity, the viscosity at infinite dilution, for polyimides of this invention should also be above 0.1, and preferably from 0.3 to 5.

The starting materials for forming the products of the present invention are organic diamines and tetracarboxylic acid dianhydrides. The organic diamines are characterized by the formula $H_2N-R^1-NH_2$, wherein $R^1$ is an aromatic organic diradical in which the aromatic ring or rings may be aromatic, heterocyclic or bridged rings wherein the bridge is oxygen, nitrogen, sulfur, silicon or phosphorus, and substituted groups thereof or directly attached rings, e.g. biphenylene, naphthylene. The preferred $R^1$ groups in the diamines are those containing at least two rings, having 6 carbon atoms characterized by benzenoid unsaturation in each ring. Such $R^1$ groups include

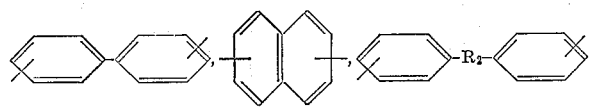

and

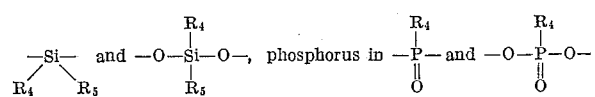

wherein $R_2$ and $R_3$ are selected from the group consisting of carbon in an alkylene chain having 1–3 carbon atoms, oxygen, silicon in

$NR_6$, and sulphur alone or in $-SO_2-$ where $R_4$ and $R_5$ are alkyl and aryl, and $R_6$ is $R_4$ or hydrogen. Among the diamines which are suitable for use in the present invention are: 4,4'-diamino-diphenyl propane; 4,4'-diamino-diphenyl methane; benzidine; 4,4'-diamino-diphenylamine; 4,4'-diamino-diphenyl sulfide; 4,4'-diamino-diphenyl sulfone; 3,3'-diamino-diphenyl sulfone; 4,4'-diamino-diphenyl ether; bis-(4-amino-phenyl)-N-methylamine; 1,5-diamino-naphthalene; 3,3'-dimethyl-4,4'-diamino-biphenyl; 3,3'-dimethoxy benzidine; 1,4-bis(p-amino-phenoxy) benzene; 1,3-bis(p-amino-phenoxy) benzene; and mixtures thereof.

The tetracarboxylic acid dianhydrides are characterized by the following formula:

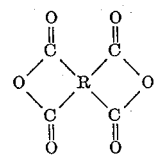

wherein R is a tetravalent organic radical selected from the group consisting of aromatic, aromatic heterocyclic, and substituted groups thereof. However, the preferred dianhydrides are those in which the R groups have at least 6 carbon atoms characterized by benzenoid unsaturation, i.e. resonating double bonds in an aromatic ring structure, wherein the 4 carbonyl groups of the dianhydride are each attached to separate carbon atoms and wherein the carbon atoms of each pair of carbonyl groups ---
[1] As measured using the technique described by F. M. Nelsen and F. T. Eggersten, Anal. Chem. 30, 1387 (1958).

are directly attached to adjacent carbon atoms in the R group to provide a 5-membered ring as follows:

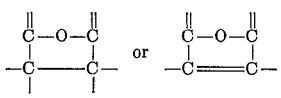

These radicals in general are derived from the group consisting of benzene, biphenyl, condensed ring aromatic compounds having 2 and 3 benzenoid rings, pyrazine,

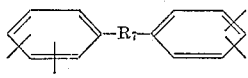

wherein $R_7$ is selected from the group consisting of —O—, —SO$_2$—, —CO— and alkylene radicals having from 1–3 carbon atoms, and aromatic heterocyclic 5 and 6 membered rings containing one hetero atom selected from the group consisting of sulfur and nitrogen.

Illustrations of dianhydrides suitable for use in the present invention include:

Pyromellitic dianhydride;
2,3,6,7-naphthalene tetracarboxylic dianhydride;
3,3',4,4'-tetracarboxybiphenyl dianhydride;
1,2,5,6-tetracarboxynaphthalene dianhydride;
2,2',3,3'-tetracarboxybiphenyl dianhydride;
2,2-bis(3,4-dicarboxyphenyl) propane dianhydride;
bis(3,4-dicarboxyphenyl) sulfone dianhydride;
bis(3,4-dicarboxyphenyl) ether dianhydride;
naphthalene-1,2,4,5-tetracarboxylic dianhydride;
naphthalene-1,4,5,8-tetracarboxylic dianhydride;
pyrazine-2,3,5,6-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
benzene-1,2,3,4-tetracarboxylic dianhydride;
3,4,3',4'-tetracarboxybenzophenone dianhydride;
etc., and mixtures thereof.

The inclusion of diamines or dianhydrides other than those disclosed may detract from one or more of the desirable properties of the polyimide of this invention. Aliphatic diamines are examples of such materials. It is obvious that inclusion of small amounts (e.g. 0.1 to 15%) of such intermediates may modify the outstanding properties of the preferred compositions only to the degree that they are present, and such compositions therefore will still be useful and valuable for certain applications and are intended to be within the class of coalescible polyimide powders of this invention.

The solvents useful in the solution polymerization process for synthesizing the polyamide-acid compositions are the organic solvents whose functional groups do not react with either of the reactants (the diamines or the dianhydrides) to any appreciable extent. Besides being inert to the system and being a solvent for the polyamide-acid, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than mono-functional primary and secondary amino groups, hydroxyl or thiol groups, and other than carboxylic acid groups or the carboxylicanhydro groups. These solvents may be characterized as chemically inert to the reactants since they do not react with either reactant but do act as solvents therefor. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid and/or polyimide powders by evaporation, displacement or diffusion. Other typical compounds of this useful class of solvents are: N,N-diethylformamide, N,N-diethylacetamide, N,N-dimethylmethoxyacetamide, N-methyl-2-pyrrolidone, N-methylcaprolactam, etc. Other solvents which may be used in the present invention are: dimethylsulfoxide, tetramethyl urea, pyridine, dimethylsulfone, hexamethylphosphoramide, tetramethylene sulfone, formamide, N-methylformamide, butyrolactone, and N-acetyl-2-pyrrolidone. The solvents can be used alone, in combinations of solvents, or in combination with poor solvents such as benzene, benzonitrile, dioxane, xylene, toluene and cyclohexane.

The finely-divided, high surface area polyimides prepared according to this invention can be made to coalesce at temperatures below the crystalline melting point into solid, homogeneous objects under the influence of heat and pressure if they cannot be molded or sintered by conventional techniques. The coalescing process requires the application of a pressure of from 2,000 to about 30,000 p.s.i. to the particulate polyimide after the particles have been heated to a temperature in the range of 200° to about 500° C., but below the crystalline melting point of the polyimide. The particulate polyimide can be heated to the requisite temperature either before or after it is placed in the mold. Although some deformation or flow of these polyimide particles is necessary to obtain coalescence, such flow or deformation is extremely limited in these polyimide particles thereby making fabrication by conventional plastics-forming techniques impractical. We have found that fabrication by coalescence of discs 1.25 inches in diameter and about 0.085 inch in thickness provides convenient pieces for testing since the problems of reproducibility of fabrication conditions are reduced to a minimum. The force necessary to break these chips in flexure can be used as the criterion of integrity and quality of the fabricated piece and, therefore, of the usefulness of the original powder.

The strength of the polyimide disc fabricated in the optimum fashion is increased markedly in the case of the products described herein where the surface area of the powder is at least 0.1 square meter/gram. A further significant improvement results from increasing the inherent viscosity or the intrinsic viscosity of the polyimide to at least 0.5 and preferably higher. The strength of these discs is related to the usefulness of this polymer powder for a variety of applications. The powders which yield discs having strength indices below 1.4 may not be useful for certain mechanical applications, but coalesced objects having such low strengths are useful in the form of electrical insulation for use at high temperatures or as thermal barriers where very high temperatures are encountered, or as a radiation resistant material. The powders which yield discs having strength indices above 1.4 are useful when coalesced into such articles as gears, bearings, mechanical seals, etc. It should be understood that the strength index is a measurement of only one useful property and that polyimide articles having a high strength index may not always be better for every use than those at the low end of the range. For the purpose of the present invention, polyimide particles displaying a strength index of 0.3–5.5 are preferred. The strength index range of 0.3 to 5.5 corresponds to a tensile strength range of about 500 to about 50,000 p.s.i.: over this range there is an approximately linear relationship between index and tensile strength.

The procedures for testing the polyimide powders and the products fabricated therefrom follow:

SURFACE AREA

Surface areas were measured by adsorption of nitrogen from a gas stream of nitrogen and helium at liquid nitrogen temperature, using the technique described by F. M. Nelsen and F. T. Eggertsen (Anal. Chem. 30, 1387

(1958)). Sample weights are in the order of 0.1–3.0 g. The thermal conductivity detector is maintained at 40° C. and the flow rate of gas is approximately 50 ml./min. The gas mixture used is 10 parts by weight nitrogen and 90 parts by weight helium.

Samples are purged with the nitrogen-helium mixture at room temperature.

Adsorption peaks are generally used for the determinations, since tailing effects are more pronounced upon desorption. Calculation of surface area is done as described by Nelson and Eggertsen. The values of surface area obtained correspond closely to values obtained using the classical B.E.T. method (S. Brunauer, P. H. Emmett and E. Teller, JACS 60, 309 (1938)).

STRENGTH INDEX

*Fabrication of the test specimen*

Two and one-half grams (2.5 gms.) of high surface area polyimide are weighed out for each disc to be fabricated and added to the mold case. This is lightly tamped or shaken to a level load before completing the assembly of the case. Two mil copper discs are used above and below the resin charge to prevent sticking to the metal parts.

Each mold case is provided with its own heater of 750 w. capacity which is fitted tightly to the case. The loading piston is spirally grooved to reduce the contact area by one-half and to assist in providing a path for any gas loss during molding and facilitating smooth easy motion when it is pressed through the case as a means of ejecting the molded specimens. A recessed backup block is used for the ejection operation, providing sufficient bottom room for the respective pieces.

Each band heater is powered through a variable transformer at approximately 8.5 amps at 115 v. and is controlled by a "Pulse Pyrovane" controller set at 490° C. and controlled by an I.C. thermocouple.

The mold case, after charging is placed on an insulating plate prepared from ⅛", "Transite," a second ⅛" "Transite" plate is placed on the mold piston. These are used to minimize heat losses to the press platens during the fabrication cycle.

*Fabrication cycle*

A 20 ton capacity "Preco" press is used for the coalescing operation. The assembled mold case with resin charge is placed between the insulated platens and wrapped with approximately ⅝" of soft glass wool insulation, and the press closed until resin is loaded to 2000 p.s.i.

The mold case is now heated to 500° C. ("Pyrovane" controlling at 490° C.); 18–20 min. is required for this operation and pressure is held at 2000 p.s.i. through heating cycle. Temperature is now held at control point for 5 min. and then pressure is rapidly increased to 20,000 p.s.i. Heat is cut immediately, insulation is removed and a strong air blast is directed at the mold case effecting cooling to 125° C. in approximately 10 minutes. Cooling to lower temperatures does not affect the finished piece, but equipment can be safely handled with cotton gloves at this temperature as the outside is considerably cooler than the temperature at the control point. The pieces are now pressed out. They consistently will run from 70 to 90 mils in thickness.

*Evaluation of specimen*

The chip is placed across a circular support having an 11/16 in. slot and is loaded by a triangular cross section bar slightly longer than the diameter of the disc with the contact edge having a radius of 1/32 in. The load is applied slowly until the chip fails and breaks. The bar is driven by a 4 in. diameter Meade air clamp and the air pressure required to break the sample is divided by the square of sample thickness to give a number which is called the strength index.

$$\text{Strength Index} = \frac{\text{p.s.i. to break}}{(\text{thickness in mils})^2 \times 10^{-3}}$$

The invention will be more clearly understood by referring to the examples which follow. These examples, which illustrate specific embodiments of the present invention, should not be construed to limit the invention in any way.

The preparations of some of the important ingredients used in the examples are given below:

4,4'-diamino-diphenyl propane was prepared by condensation of aniline hydrochloride and acetone according to the method described in German Patent 399,149.

4,4'-dinitrodiphenyl ether was prepared by condensation of p-chloronitrobenzene with the sodium salt of p-hydroxynitrobenzene. This was reduced with hydrogen in the presence of a suitable hydrogenation catalyst to give 4,4'-diaminodiphenyl ether. The diamine was purified by recrystallization from butanol.

The pyromellitic dianhydride used was obtained as white crystals by sublimation of the commercial product through silica gel at 220–240° C. and 0.25–1 mm. mercury pressure.

N,N-dimethylformamide and N,N-dimethylacetamide were purified by fractional distillation from phosphorous pentoxide or by other procedures suitable for removing water or peroxides; a fraction distilling at 47.5° C. and 17 mm. pressure is N,N-dimethylformamide and a fraction distilling at 73° C. and 30 mm. pressure is N,N-dimethylacetamide.

Unless stated otherwise, the inherent viscosity of polyamide-acid was obtained using a 0.5% solution in N,N-dimethylacetamide at 35° C. and the inherent viscosity of polyimide was obtained using a 0.5% solution in a 1:1 mole ratio mixture of water and sym-dichlorotetrafluoroacetone at 35° C.

EXAMPLE I

A freshly prepared solution of 1001 g. of highly purified 4,4'-diaminodiphenyl ether in 6.5 kg. of highly purified dimethylacetamide was added rapidly to a freshly prepared solution of 1085 g. of highly purified pyromellitic dianhydride in 12.1 kg. of dimethylacetamide with good agitation. The solutions were prepared under dry nitrogen. The mixed solution was kept at 30° C. and stirred for an hour during which time the viscosity increased. The resulting polyamide-acid had an inherent viscosity of 2.0 as measured from a 0.5% by weight solution in dimethylacetamide at 35° C. Two hundred grams of this polyamide-acid solution (0.048 mole) was treated with 30 ml. of pure, dry dimethylacetamide which contained 0.048 mole of trimethylamine. The mixture was heated to 145° C. with stirring and held at this temperature for a total time of 17 minutes. The yellow polyimide began to precipitate after 2 minutes at 145° C. At the completion of the heating period, the product was separated by filtration and purified by acetone washing followed by drying in a vacuum oven at 60° C. The dry product was then heat treated for 16 hours at 325° C. in a nitrogen atmosphere. The yield of product was 87% of theory. A 1¼ inch diameter chip was coalesced, as previously described, at 500° C. using the standard cycle. The chip was brown in color, had a density of 1.427 and a strength index of 2.8.

EXAMPLE II

Two hundred grams of the polyamide acid solution prepared in Example I prior to addition of trimethyl amine was heated to its boiling point (165–168° C.) and held under reflux for 15 minutes. The yellow polyimide began to precipitate after 4.5 minutes at the boiling point. At the completion of the heating period, the product was separated by filtration and purified by acetone washing followed by drying in a vacuum oven at 60° C. After a heat treatment for 16 hours at 325° C. in a nitrogen atmosphere, the yield was only 77% of theory. A 1¼ inch diameter chip was coalesced at 500° C. using the standard cycle. It cracked into small pieces in the mold and the pieces were so brittle that it could not be considered to be a useful product for mechanical applications. Since a 1.4 strength index has been found to be about as low a value as will permit fabricating an unbroken chip by this technique, this sample had less than a 1.4 strength index. The low strength index of this product is the result of degradation, primarily hydrolytic, of the polymer. This illustrates that conversion to polyimide without using tertiary amines results in low strength products.

EXAMPLE III

A solution of 1.823 kg. of 4,4'-diaminodiphenyl ether in 44.5 lbs. of anhydrous pyridine was added rapidly to a solution of 1.985 kg. of pyromellitic dianhydride in 44.0 lbs. of anhydrous pyridine. The mixture was stirred 15 minutes, during which the temperature rose from 20° C. to approximately 38° C. It was then pumped into a kettle containing 26.5 lbs. of anhydrous pyridine which was refluxing at 155–160° C. under pressure varying between 25 p.s.i. and 45 p.s.i. The entire mixture was brought up to 150° C. and refluxed for 15 minutes. The maximum temperature reached was 162° C. The mixture was then cooled to 20° C. and filtered. The polyimide powder was washed by slurrying it in 25 gallons of acetone and filtering again. The powder was then dried under vacuum for 24 hours at 60° C. The polyimide powder thus obtained was coalesced into a 3-inch diameter disc by means of the standard coalescing procedure described above. Tensile bars, machined from these discs, showed tensile strengths in excess of 10,000 p.s.i. The surface area of the polyimide powder was 100 square meters per gram. The inherent viscosity of the polyamide-acid, as measured from a 0.5% by weight solution in pyridine at 35° C., was 1.0. The polyimide was insoluble in sym-dichlorotetrafluoroacetone monohydrate.

EXAMPLE IV

A 3.1978 g. sample of bis-(3,4-dicarboxyphenyl) ether dianhydride was mixed with 3.0136 g. of 1,3 bis-(p)-aminophenoxy) benzene in a flask. To this was added 200 ml. of N,N-dimethylacetamide. The mixture was stirred until in solution, and stirring was then continued for half an hour. The initial temperature was 25° C. which rose slightly while the reaction was taking place. The polyamide-acid thus formed had an inherent viscosity of 0.83. To this solution 10 ml. of 2,4-lutidine was added, and the temperature raised to 135° C. for 20 minutes. During this period the polyimide formed as a precipitate.

EXAMPLE V

A freshly prepared solution of 1001 g. of 4,4'-diaminodiphenyl ether in 6.5 kg. of highly purified N,N-dimethylacetamide was added rapidly to a freshly prepared solution of 1085 g. of highly purified pyromellitic dianhydride in 12.1 kg. of N,N-dimethylacetamide, using good agitation. The solutions were prepared under a nitrogen blanket. The reaction was started at 25° C. The viscosity of the solution increased and stirring was continued for one hour. The polyamide acid had an inherent viscosity of 2.0. Two hundred grams of this polyamide-acid solution (0.048 mole) were treated with 9.6 g. (.096 mole) of dry triethylamine. The mixture was heated to 140° C. with stirring and held at this temperature for a total time of 16.5 minutes. The yellow polyimide began to precipitate after 1.5 minutes at 140° C. At the completion of the heating period, the product was separated by filtration and purified by acetone washing followed by drying in a vacuum oven at 60° C. The dry product was then heat treated for 16 hours at 325° C. in a nitrogen atmosphere. The yield was 90% of theory.

A 1¼" diameter chip of the product was coalesced at 500° C., using the standard cycle. It was brown in color and had a strength index of 2.6.

EXAMPLE VI 10.35 grams (0.046 mole) of 2,2-bis(4-aminophenyl) propane was dissolved in 40 milliliters N,N-dimethylformamide. 10.0 grams (0.046 mole of pyromellitic dianhydride was added portion-wise with agitation while the solution was cooled with water at 15° C. circulating through an outer jacket. The reaction was allowed to continue for approximately 60 minutes and was considered substantially complete as evidenced by the noticeable increase in viscosity. The inherent viscosity of the polyamide-acid was 1.4.

To the above formed solution, 30 g. of N,N-diethyl cyclohexylamine was added and the temperature raised to 125° C. for 18 minutes. Shortly after reaching 125° C. the polyimide began to precipitate. The product was filtered, washed with acetone, and dried in a vacuum oven at 60° C. for 30 minutes. The powder was then heat treated in an oven for 16 hours at 325° C. The resulting polyimide was satisfactorily fabricated into 1¼" chips using the standard coalescing procedure outlined above.

EXAMPLE VII

Bis(4-aminophenyl) methane, 3.0 grams (0.0151 mole) was dissolved initially in 25 milliliters of N,N-dimethylformamide. Pyromellitic dianhydride, 3.3 grams (0.0151 mole) was added portion-wise with agitation. During the entire operation (approximately 30 minutes) the reaction vessel was cooled by tap water (about 15° C.) circulating through the outer jacket. The last portion of dianhydride was added with 25 ml. of N,N-dimethylformamide to give a resultant viscous solution containing 11.7% by weight polymer. Five grams of N,N-dimethylbenzylamine were added and the temperature raised to 100° C. for 30 minutes. The solution was filtered and the polyimide obtained was washed with acetone, and dried in a vacuum oven at 60° C. for thirty minutes. The resulting powder was heat treated in an oven at 325° C. under a nitrogen blanket for 16 hours. The resulting polyimide was satisfactorily fabricated into 1¼" diameter chips using the standard coalescing procedure outlined above.

EXAMPLE VIII

A stirred mixture of 17.91 g. of 3,3',4,4-benzophenonetetracarboxylic acid and 60 ml. of phenyl ether was heated at 250° until all the acid had been dehydrated to the dianhydride as indicated by the formation of a clear solution. The solution was then cooled to 220° and was diluted with 60 ml. of pure dimethylacetamide, which brought the temperature of the solution down to 160°. At this point, a solution of 5.41 g. of m-phenylenediamine in 60 ml. of dimethylacetamide was added followed, after 2 minutes, by a solution of 7.6 g. of triethylamine in 10 ml. of diamethylacetamide, a small sample of the viscous polyamide acid solution was removed just prior to the triethylamine addition. Its inherent viscosity was 0.33. The reaction mixture was stirred at 145–150° for twenty minutes and at the end of this time, the insoluble polyimide was separated by filtration and was purified by two acetone washes followed by drying in a vacuum oven at 60–80°. The dry powder was then given a heat treatment at 325° under nitrogen for 8 hours prior to fabrication.

Fabrication was carried out at 410° using 6,000 p.s.i. pressure. The strength index of the product was 3.9.

EXAMPLE IX

Bis(4-amino phenyl) sulfone, 11.3 grams (0.0455 mole) and 14.1 grams 0.0458 mole of bis(2,3-dicarboxyphenyl) methane dianhydride were weighed, mixed and added portion-wise into 60 milliliters of N,N-dimethylformamide, with stirring, over a period of 1 hour. The last portion of the reactants was added with 5 milliliters of N,N-dimethylformamide. The reaction was allowed to proceed for 24 hours; during the entire time interval, the reaction vessel was cooled externally with circulating water at about 15° C. Another 5 milliliters of N,N-dimethylformamide was added and a viscous solution obtained containing 23.2% by weight of the polymer. The inherent viscosity of the polyamide-acid was 0.72 as measured as a 0.5% solution in N,N-dimethylformamide at 30° C. Twenty grams of 4-methylpyridine was added to the polyamide-acid solution obtained above and the temperature raised to 145° C. for 25 minutes. The resulting polyimide formed as a precipitate which was filtered from the solution, washed in acetone, and dried at 60° C. in a vacuum oven for thirty minutes. The polyimide was then heat treated at 325° C. for 16 hours in a nitrogen atmosphere. The resulting polyimide was coalesced into 1¼" diameter chips, using the standard coalescing procedure outlined above, with satisfactory results.

EXAMPLE X 27.0 grams (0.1 mole) of 4,4'-diaminodiphenyldiethylsilane was dissolved in 200 milliliters of dimethyl formamide. 31.0 g. (0.1 mole) of bis(3,4-dicarboxyphenyl) ether dianhydride was added portion-wise with agitation while the solution was externally cooled with circulating water at about 15° C. A viscous solution of polyamide-acid was formed after 20 minutes. The inherent viscosity of the polyamide-acid was greater than 0.1 as measured as a 0.5% by weight solution in dimethylformamide. Fifty grams of 4-benzyl pyridine was added to the solution and the temperature raised to 140° C. for 25 minutes. The polyimide formed as a precipitate which was filtered, washed with acetone, and dried at 60° C. in a vacuum oven for 30 minutes. The polyimide was then heat treated at 325° C. for 16 hours in a nitrogen atmosphere. The resulting polyimide powder was coalesced into a 1¼" diameter chip, using the standard coalescing procedure outlined above, with satisfactory results.

EXAMPLE XI 30.8 grams of 4,4'-diaminodiphenyl phenylphosphine oxide was dissolved in 200 milliliters of dimethylformamide. 29.4 grams of 3,3',4,4'-tetracarboxylbiphenyl dianhydride was added portion-wise with agitation while the solution was externally cooled wtih circulating water at about 15° C. A viscous solution of polyamide-acid was formed after 24 minutes. The inherent viscosity of the polyamide-acid was greater than 0.1. Fifty grams of pyridine was added to the solution and the temperature raised to 100° C. for 2 hours. The polyimide formed as a precipitate which was separated from the solution by filtration, washed with acetone, and dried in a vacuum oven at 60° C. for 30 minutes. The polyimide was then heat treated at 325° C. in a nitrogen atmosphere for 16 hours. The resulting polyimide powder was coalesced into 1¼" diameter chips, using the standard coalescing procedure outlined above with satisfactory results.

EXAMPLE XII 21.6 grams of 4,4'-diamino-diphenyl N-methylamine was dissolved in 200 milliliters of dimethylformamide. 31.0 grams of 3,3',4,4'-tetracarboxybenzophenone dianhydride was added portion-wise with agitation while the solution was externally cooled with circulating water at 15° C. A viscous solution of polyamide-acid was formed after 20 minutes. The inherent viscosity of the polyamide-acid was greater than 0.1. Fifty grams of 3,4-lutidine was added and the solution heated to 140° C. for 20 minutes. The solution was then filtered to recover the polyimide precipitate which had formed, which was then washed with acetone, and dried at 60° C. for 30 minutes in a vacuum oven. The polyimide was then heat treated for 16 hours at 325° C. in a nitrogen. The resulting polyimide was then coalesced into 1¼" diameter chips, using the standard coalescing procedure outlined above, with satisfactory results.

EXAMPLE XIII 7.6 grams of 4,4'-diamino-diphenyl sulfide was dissolved in 200 milliliters of dimethylformamide. 12.5 grams of bis(3,4-dicarboxyphenyl) sulfone dianhydride was added portion-wise with agitation while the solution was externally cooled with circulating water at about 15° C. A viscous solution of polyamide-acid was formed after 15 minutes. The inherent viscosity of the polyamide-acid was greater than 0.1. Twenty grams of N-methyl morpholine was added and the temperature of the solution raised to 150° C. for 25 minutes. The polyimide formed as a precipitate which was filtered from the solution, washed with acetone, and dried in a vacuum oven for 30 minutes at 60° C. The resulting polyimide was coalesced into 1¼" diameter chips, using the standard coalescing procedure outlined above, with satisfactory results.

EXAMPLE XIV

In a nitrogen atmosphere, 2.1810 grams (0.0065 mole) of 2,2-bis(dicarboxyphenyl) propane dianhydride was added in small portions with stirring, over a period of ten minutes, to a solution of 1.2954 grams (0.0065 mole) of bis(p-aminophenyl) ether in 18 milliliters of anhydrous pyridine. An additional 30 milliliters of pyridine was added to the reaction mixture. The addition of the dianhydride produced a bright yellow color which gradually disappeared. The reaction was conducted at room temperature (23° C.) and during the reaction the temperature did not rise more than 5–10° C. The resulting solution, containing about 6.5% by weight of the polyamide-acid, was slightly yellow and viscous. The inherent viscosity of the polyamide-acid was greater than 0.3. The polyamide-acid solution was then heated to 125° C. for 15 minutes, during which time a polyimide precipitate formed. The precipitate was filtered from the solution, washed with acetone, and dried in a vacuum oven at 60° C. for 30 minutes. The precipitate was then heat treated for 16 hours at 325° C. in a nitrogen atmosphere. The resulting polyimide powder was then coalesced into a 1¼" diameter chip, using the standard coalescing procedure described above, with satisfactory results.

EXAMPLE XV 3.02 grams of bis-(4-aminophenoxy)diethylsilane was dissolved in 25 ml. of pyridine. 2.68 grams of 2,3,6,7-naphthalenetetracarboxylic dianhydride was dissolved in 25 ml. of pyridine. The two solutions were heated to 98° C. and then mixed. After 15 minutes the temperature was raised to 145° C. and held there for 18 minutes. Then the solution was filtered, and the resulting precipitated polyimide was washed with acetone and dried at 60° C. for 30 minutes in a vacuum oven. The polyimide was heat treated at 325° C. for 16 hours in a nitrogen atmosphere. The resulting polyimide powder was coalesced into a 1¼" diameter chip, using the standard coalescing procedure outlined above, with satisfactory results.

EXAMPLE XVI 3.40 grams of bis-(4-aminophenyl) phenyl phosphonate was dissolved in 50 ml. of pyridine. 2.20 grams of pyrazine-2,3,5,6-tetracarboxylic dianhydride was added portion-wise wtih agitation while the solution was externally cooled with circulating water at about 15° C. A viscous solution of polyamide-acid was formed after 20 minutes. The solution was then heated to 145° C. for twenty minutes. The polyimide formed as a precipitate, which then was filtered from the solution, washed with acetone, and dride in a vacuum oven at 60° C. for 30 minutes. The polyimide was then treated in a vacuum oven at 325° C. for 16 hours in a nitrogen atmosphere. The resulting polyimide powder was coalesced into a 1¼" diameter chip, using the standard coalescing procedure outlined above, with satisfactory results.

EXAMPLE XVII

A sample of polyamide acid prepared in pyridine, as in Example III, was injected into a flask containing refluxing pyridine (115° C.). Attached to the flask was a Soxhlet extractor containing molecular sieves (Linde 5 A) which served to remove the water from the reflux condensate before return to the flask. In this manner, the concentration of water in the flask was kept at a minimum reducing the possibility of hydrolytic degradation of the polymer during this azeotropic distillation. Refluxing was continued two hours, during which time a slurry of polyimide formed in the flask. After filtering, washing, and heating at 325° C. under nitrogen for 16 hours, the polymer was coalesced into a strong chip having a strength index of 3.0.

EXAMPLE XVIII

A stirred mixture of 53.73 g. of 3,3', 4,4'-benzophenonetetracarboxylic acid and 180 ml. of phenyl ether was heated at 250° until all the acid was dissolved and converted to dianhydride. The solution was then cooled to 220° and was diluted with 180 ml. of pure dimethylacetamide, which brought the temperature of the solution down to 150°. Immediately afterward, a solution of 30.03 g. of pure 4,4-diaminodiphenyl ether in 180 ml. dimethylacetamide was added followed, after 1–2 minutes, by a solution of 22.8 g. triethylamine in 29 ml. of dimethylacetamide. A small sample of the viscous polyamide acid solution was removed just prior to the triethylamine addition. Its inherent viscosity was 0.77. The reaction mixture was stirred at 150–155° for twenty minutes and, at the end of this time, the insoluble polyimide was separated by filtration and purified by two acetone washes followed by drying in a vacuum oven at 60–80°. The dry powder was then given a heat treatment at 325° under nitrogen for 8 hours prior to fabrication.

The product was readily coalesced at 400° and 3000–4000 p.s.i. pressure. Its strength index was 6.1. Fundamental physical properties were:

| | | |
|---|---|---|
| Tensile strength | p.s.i. | 23,400 |
| Tensile elongation | percent | 10.6 |
| Tensile impact strength | ft. lb./in.$^3$ | 194 |

It is considered to be of advantage to use pyridine as a combination solvent for the dianhydride and diamine, and as the catalyst for the conversion from polyamide-acid to polyimide, because the same solvent can be used over and over again with only a minor purification between uses.

The polyimide particles of this invention find many applications. The useful combination of the desirable electrical, physical and chemical characteristics of these polymers is unique. Since fabricated parts of these polyimide particles retain their strength and excellent response to work-loading at elevated temperatures for prolonged periods of time, they offer commercial utility in a wide range of end uses. The polyimide polymers of this invention are distinguished in having a combination of excellent resistance to corrosive atmospheres, an outstanding resistance to degradation by high energy particles and gamma ray radiation. These polymers resist melting upon exposure at high temperatures (many of them over 500° C.) for extended periods while retaining hitherto unrealized high proportions of room temperature physical properties. Because of the unusual and surprising ability of the high surface area particles to coalesce at a temperature below the crystalline melting point under heat and pressure, these polymers may be processed into many desirable articles not obtainable by any other means.

The polyimides of this invention are also useful in combination with other materials; e.g. finely divided metals, metal oxides, minerals, synthetic inorganics, glasses and other high temperature polymers such as polytetrafluoroethylene. These materials may be incorporated as suspensions in the polyamide-acid solutions so that they will be intimately mixed with the high surface area polyimide particles. They may also be incorporated by mixing of the finished polyimide with the modifying solid also in finely divided state. Graphite improves the frictional characteristics. Finely divided aluminum makes the solid polyimide conductive. Inorganic fillers improve stiffness.

The method of fabrication described earlier for use in making test pieces can also be used to make bushings, seal faces, bearings, abrasive wheels, electrical brushes, electric insulators, compressor vanes, pistons and piston rings, brake linings, clutch faces, gears, thread guides and cams. The properties of the coalesced polyimides make them outstanding as shaped articles in each of the above uses.

I claim:

1. A process for preparing a particulate, finely-divided powder of at least one polyimide which comprises steps of: (A) reacting at least one diamine having the structural formula $H_2N-R^1-NH_2$ wherein $R^1$ is selected from the group consisting of

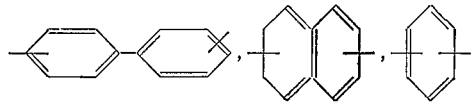

and

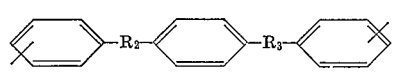

wherein $R_2$ and $R_3$ are selected from the group consisting of carbon in an alkylene chain having 1–3 carbon atoms, oxygen, silicon in

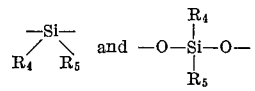

phosphorus in

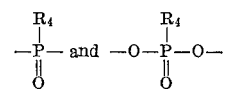

$NR_6$, sulphur alone and $-SO_2-$, where $R_4$ and $R_5$ are selected from the group consisting of alkyl and aryl radicals and $R_6$ is selected from the group consisting of alkyl radicals, aryl radicals, and hydrogen, with at least one tetracarboxylic acid dianhydride having the structural formula:

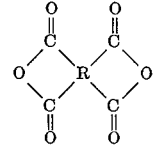

wherein R is a tetravalent radical selected from the group consisting of tetravalent radicals of benzene, biphenyl, and aromatic condensed ring compounds having 2 and 3 benzenoid rings, and

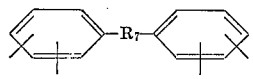

wherein $R_7$ is selected from the group consisting of $-O-$, $-CO-$, $-SO_2-$, and alkylene radicals having from 1–3 carbon atoms, and wherein the four carbonyl groups are attached to different ring carbon atoms in the radical, said carbonyl groups being in two pairs, each pair being attached to a single ring, the reaction being carried out in pyridine to form a solution of a polymeric composition containing polyamide-acid; (B) heating said solution of said polyamide-acid at a temperature of from 100° C. to 200° C. for a time sufficient to form a polyimide, which precipitates as a powder insoluble in cold basic reagents; and (C) separating out said polyimide in the form of a powder having a surface area above 1 square meter per gram.

2. The process of claim 1, wherein the dianhydride is pyromellitic dianhydride.

3. The process of claim 1, wherein the diamine is 4,4'-diaminodiphenyl ether.

4. The process of claim 1, wherein the dianhydride is 3,3',4,4'-benzophenonetetracarboxylic dianhydride.

5. The process of claim 1, wherein the diamine is m-phenylenediamine.

References Cited by the Examiner

UNITED STATES PATENTS

| | | | |
|---|---|---|---|
| 2,710,853 | 6/1955 | Edwards et al. | 260—78 |
| 2,712,543 | 7/1955 | Gresham et al. | 260—78 |
| 2,731,447 | 1/1956 | Gresham et al. | 260—78 |
| 2,880,230 | 3/1959 | Edwards et al. | 260—78 |
| 2,900,369 | 8/1959 | Edwards et al. | 260—78 |
| 3,037,966 | 6/1962 | Chow et al. | 260—78 |
| 3,049,518 | 8/1962 | Stephens | 260—78 |

WILLIAM H. SHORT, *Primary Examiner.*

LOUISE P. QUAST, *Examiner.*